US011349834B2

(12) United States Patent
Burris et al.

(10) Patent No.: US 11,349,834 B2
(45) Date of Patent: May 31, 2022

(54) MULTI-FACTOR SECURE OPERATION AUTHENTICATION

(71) Applicant: NCR Corporation, Atlanta, GA (US)

(72) Inventors: Matthew Robert Burris, Atlanta, GA (US); Jodessiah Sumpter, Roswell, GA (US)

(73) Assignee: NCR Corporation, Atlanta, GA (US)

( * ) Notice: Subject to any disclaimer, the term of this patent is extended or adjusted under 35 U.S.C. 154(b) by 793 days.

(21) Appl. No.: 16/262,205

(22) Filed: Jan. 30, 2019

(65) Prior Publication Data
US 2020/0244650 A1 Jul. 30, 2020

(51) Int. Cl.
*G06F 21/00* (2013.01)
*H04L 9/40* (2022.01)
*G10L 17/24* (2013.01)
*G10L 17/06* (2013.01)

(52) U.S. Cl.
CPC .......... *H04L 63/0861* (2013.01); *G10L 17/06* (2013.01); *G10L 17/24* (2013.01)

(58) Field of Classification Search
CPC ........... H04L 63/0861; H04L 2463/082; G10L 17/06; G10L 17/24; G10L 25/48; G06F 2221/2111; G06F 21/32
See application file for complete search history.

(56) References Cited

U.S. PATENT DOCUMENTS

| 10,015,637 | B2 * | 7/2018 | Shulman | H04W 4/021 |
|---|---|---|---|---|
| 2013/0227651 | A1 * | 8/2013 | Schultz | H04L 63/0861 726/4 |
| 2015/0269946 | A1 * | 9/2015 | Jones | G10L 17/22 704/273 |
| 2016/0180078 | A1 * | 6/2016 | Chhabra | H04L 63/083 726/19 |
| 2017/0180339 | A1 * | 6/2017 | Cheng | H04L 63/08 |
| 2018/0007060 | A1 * | 1/2018 | Leblang | G06F 21/32 |
| 2018/0039990 | A1 * | 2/2018 | Lindemann | G06K 9/00577 |
| 2018/0047393 | A1 * | 2/2018 | Tian | G06F 21/32 |
| 2018/0121642 | A1 * | 5/2018 | Cooper | H04L 63/0853 |
| 2018/0174146 | A1 * | 6/2018 | Bansal | G06F 21/88 |
| 2019/0156003 | A1 * | 5/2019 | Alameh | G06F 21/45 |

* cited by examiner

*Primary Examiner* — Jeffrey C Pwu
*Assistant Examiner* — William A Corum, Jr.
(74) *Attorney, Agent, or Firm* — Schwegman, Lundberg & Woessner (57) ABSTRACT

A user makes a request from a requesting device for access to a secure operation associated with a network-based service. A first biometric authentication is processed for the request and at least one second scope-based authentication is processed for the request based on an analysis of a physical environment for the requesting device. A determination is made based on at least the first biometric authentication and the scope-based authentication whether the secure operation can be: processed on behalf of the user by the network-based service, not processed at all, or processed only if requested from a specific medium/channel associated with a specific device, which may or may not be the requesting device.

17 Claims, 5 Drawing Sheets

MULTI-FACTOR SECURE OPERATION AUTHENTICATION

BACKGROUND

Increasingly individual are relying on electronic transactions to perform operations with enterprises. Many of these operations are sensitive such that in processing the operations, confidential information or private information of the user is exposed over networks to potential hackers.

The security flaws of existing applications and systems used to process enterprise operations on behalf of users are becoming more noticeable in the industry. Hackers are also becoming more adept in adjusting to security put in place to protect the users' private information.

The problem is being exacerbated by the adoption of voice-based services that allow users to now perform operations through voice interaction. Any hacker that is within earshot of or near a user performing a voice-based sensitive operation can potentially capture a recording of the user's voice commands or simply repeat the voice commands in a voice of the hacker to perform a different operation on a user's account. Voice authentication used by some systems have not solved the security issues, because some users may be under duress, such that the duress (an intruder) is forcing the user to perform a given operation.

Some enterprises have recognized the security issues associated with sensitive voice-based operations and determined that it is better not to permit such operations because the enterprises are unable to provide sufficient security for the user. For example, existing voice assistants typically will not permit a home owner to disarm the homeowner's security system through voice. As another example, financial institutions have generally not permitted voice-based financial operations against a user's financial accounts. Both of these situations could include circumstances where a user is actually performing the sensitive voice operation but unwillingly so, such that existing security approaches are unable to safely determine whether the user is fully consenting for the operation or performing the operation without consent (unwillingly and while under duress of someone else near or with the user).

SUMMARY

In various embodiments, methods and a system for multi-factor authentication of a secure operation are presented.

According to an embodiment, a method for multi-factor authentication of a secure operation is presented. A request is received to process an operation. A first-factor biometric authentication is performed against a user that initiated the request. A second-factor authentication is processed against a physical environment of the user. A determination is based on results of the first-factor biometric authentication and the second-factor authentication whether the request can be processed on behalf of the user.

DETAILED DESCRIPTION

Figure 1:
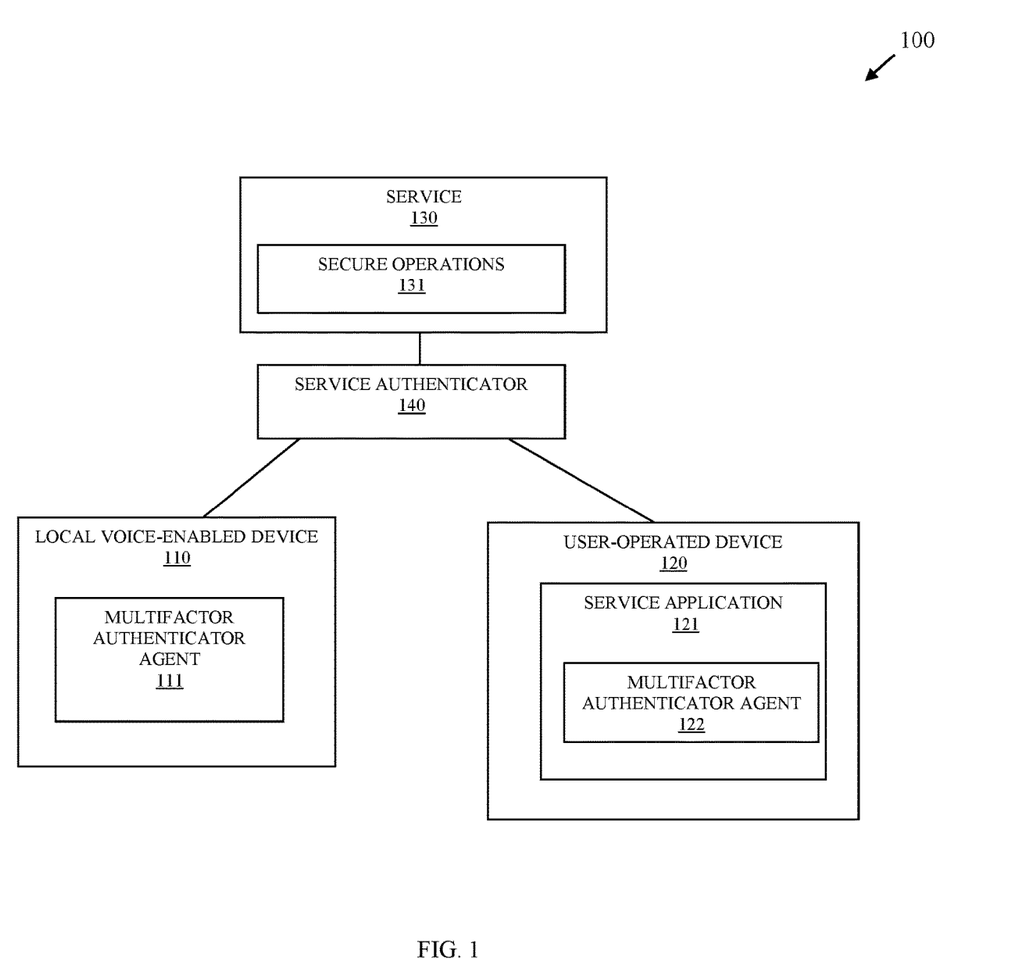
FIG. 1 is a diagram of a system for multi-factor authentication of a secure operation, according to an example embodiment.

FIG. 1 is a diagram of a system 100 for multi-factor authentication of a secure operation, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of i multi-factor authentication of a secure operation, presented herein and below.

As used herein and below, the terms "customer," "consumer," and "user" may be used interchangeably and synonymously.

As used herein "authentication" is intended to mean a security procedure processed to determine whether: 1) a user is authorized or unauthorized to proceed with a request to have a secure operation 131 processed on behalf of the user by a service 130; 2) additional and/or different types of authentication are needed before the secure operation 131 can be processed; and/or 3) a specific medium/channel type of authentication that is required of the user to have the secure operation 131 processed.

As used herein "multifactor authentication" includes at least 2 authentications.

As used herein "initiating environment" refers to 1) the physical environment of the user when initiating a request for processing a secure operation 131 and 2) a detected wireless network accessible to the local voice-enabled device 110 and/or the user-operated device 120 from the physical environment of the user.

As used herein "issuing environment" refers to the medium/channel that the user is permitted to proceed with requesting the secure operation 131 for processing by the service 130. In some cases, the medium/channel used with the initiating environment is the same as the issuing environment; in other cases, based on the multifactor authentications the medium/channel used with the initiating environment is different from the actual medium/channel used in the issuing environment. "Medium/channel" refers to the type of communication used by or required of the user in order to properly request the secure operation 131, such as voice, text, service application 121, etc.

Further, the terms "scope" and "zone" may be used synonymously and interchangeably within the context of an authentication. These terms are intended to mean a proximity based authentication based on individuals that are in proximity to an initiating environment, devices within the initiating environment as defined by the available wireless network within the initiating environment, and movements of those devices within the initiating environment.

The system 100 includes a user-operated device 120 having a service application 121 that includes a novel multifactor authentication agent 122. In some cases, the system 100 may also include a local voice-enabled device 110 that includes a novel multifactor authentication agent 111. The system further includes a service authenticator 140 and a networked-based service 130 having one or more secure operations 131.

It is to be noted that although not illustrated in the FIG. 1, the user-operated device 120, the local voice-enabled device 110, any server device(s) that executes the service authenticator 140 and the service include one or more hardware processors, volatile and non-volatile memory, non-volatile storage, and networking circuitry (such as wired ports and/or wireless transceivers).

Furthermore, the components 121, 122, 111, 140, 130, and 131 are provided as executable instructions that reside on their devices within non-transitory computer-readable storage mediums and that are executed on their devices by one or more hardware processors of their respective devices to perform the processing discussed herein and below.

The system 100 performs novel multifactor authentication of a user for purposes of determining whether a user is authorized or unauthorized to request the service 130 to perform one or more secure operations 131 on behalf of the user.

The user attempts to initiate a secure operation 131 with the service 130 through voice commands although it is to be noted that non-voice based initiated secure operations 131 may also benefit from the teachings presented herein.

The number of different authentications (multifactor) performed against a user for an initiated operation 131 can be determined based on how the user initiates the operation and factors set by both the enterprise associated with the service 130 and the user. Also, additional authentications can be processed based on results of a previous authentication. Furthermore, the medium/channel that that is used by the user to initiate a request for an operation 131 can be changed based on the authentications or results of previous authentications, such that the user is only able to request that the operation 131 be performed over a different medium/channel from the initiating medium/channel.

At least one of the multiple authentications performed by multifactor authentication agents 111 and/or 122 include a scope authentication that authenticates a physical environment of the user when the user initiates an operation 131. The scope is a proximity (vicinity) authentication based on known devices and unknown device detected within the physical environment of the user and based on detected audio of other individuals that are not the user present within the physical environment.

In some cases, a user can override or authorize a failed scope authentication during a subsequent authentication; in other cases, the user cannot override a failed scope authentication in any subsequent authentication.

The components of the system 100 will now be discussed by way of example illustrations and example scenarios with reference to the FIGS. 1 and 2. It is to be noted that other scenarios are possible without departing from the multifactor secure operation authentication discussed herein.

Figure 2:
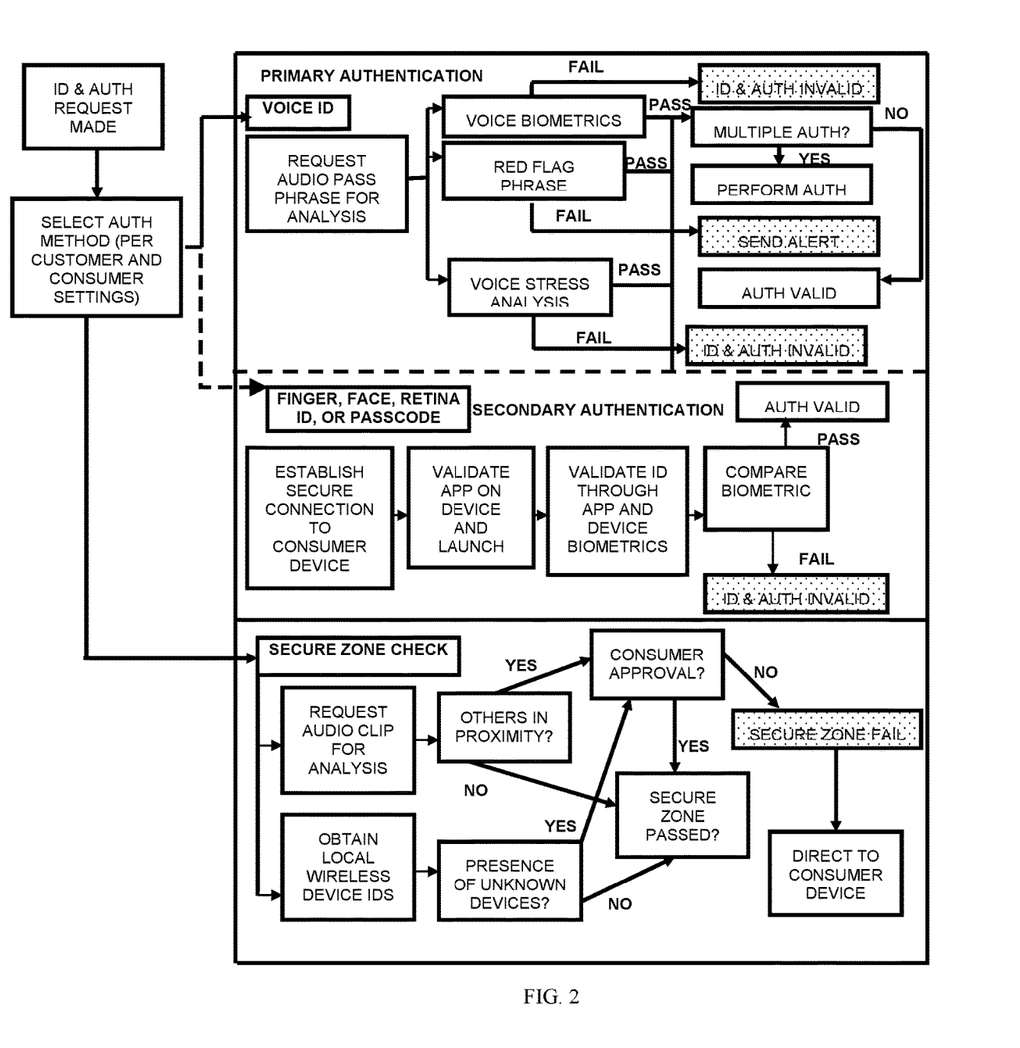
FIG. 2 is a diagram representing processing for a system that performs multi-factor authentication of a secure operation, according to an example embodiment.

FIG. 2 is a diagram representing processing for the system 100 that performs multi-factor authentication of a secure operation, according to an example embodiment. The processing recited in the FIG. 2 is implemented as executable instructions that reside in non-transitory computer-readable storage medium(s) and that are executed by one or more hardware processors of one or more of the devices: 110, 120, and the server device associated with the secure authenticator 140.

A user makes a request to access a financial institution for purposes of using a financial service 130 and performing a financial transaction (secure operation 131). The identifier (ID) of the user and the request for authorization is made over an initiating medium/channel (this can be through the local voice-enabled device 110 and/or the user-operated device 120). A connection is made to the service authenticator 140 and a profile for the user (and perhaps a profile maintained by the financial institution) to obtain settings that identify the type of authentication permitted or defined by the user and the financial institution for the financial operation (secure operation 131).

Assuming voice identification is permitted, then the agents 111 and 122 (or just one of the agents 111 or 122) request a verifying audio pass phrase from the user. The user speaks the phrase into a microphone associated with the local voice-enabled device or the user-operated device 120. Either the agent 111 or 122 (depending upon the device being used by the user, device 110 or 120) performs three separate authentications (multifactor consisting of 3 separate authentications): voice-based biometric authentication, red flag phrase authentication, and a voice stress test authentication. If any of the three authentications fail, then the user is not permitted to use the initiated medium/channel to continue if the user desires to have the financial transaction (secure operation 131) processed by the financial service (service 130) with the user's financial institution.

The voice biometrics processes voice-based authentication of the phrase for the user's registered voice. It is to be noted that this voice-based authentication may be processed for a hash/signature locally on devices 110 or 120 or the audio may be passed from devices 110 or 120 where the service authenticator 140 performs the voice biometric authentication on the pass phrase for a matching hash/signature expected for the user associated with the user identifier. In an embodiment, the agents 111 and 122 and/or the service authenticator 140 are configured to allow the user to attempt a predefined number of sample pass phrases before the agents 111 and 122 and/or the service authenticator 140 fail the user for access to the operation.

During the red flag phrase authentication, the agents 111, 122, and/or the service authenticator 140 sends an alert if the red flag phrase authentication fails. In an embodiment, this alert is sent to the service 130 and instructs the service 130 to place a security hold on the user's account associated with the financial transaction. In an embodiment, the alert can be sent to external systems such as governmental agencies. In an embodiment, the alert is a plurality of alerts to the financial institution's security system, to place a hold by the service on the account, and to governmental law enforcement agencies. The type of alert(s) and the automated actions taken by the subsequent system can be configured based on policy of the financial institution and/or regulations of the governmental agencies.

If the voice stress analysis authentication fails, the agents 111, 122, and/or the service authenticator 140 is configured to allow the user to provide a different sample phrase up to a predefined number of attempts. The voice stress analysis authentication captures whether the voice of the user in the audio (voice) phrase provided appears to be under stress, such that a hash/signature for stress of the user is higher than a predefined threshold allowed for an acceptable threshold level of stress. The analysis for stress accounts for the pitch, tone, volume and other factors that indicate stress in the audio sample provided by the user.

The user is not permitted to proceed with additional authentications unless all of the voice biometrics, red flag, and voice stress authentications have already passed.

Assuming all of the three authentications on the voice sample provided by the user pass, a check is made to determine if a policy condition or setting provided by the user in a profile of the user and/or provided by the financial institution is set that requires additional authentications of the user to perform the request financial transaction (secure operation 130).

When additional authentications are needed following the primary authentication based on voice, the user can perform secondary authentication with or without biometrics collected from the user device 120 for the user. Here, the user may be required if he has not already to open and launch the service application 121 during which a connection is made before the user-operated device 120 and the service 130 through the service authenticator 131 using either user-supplied credentials or saved credential provided by the service application 121 when launched by the user on the device 120. Once this is validated, the user provides additional non-voice biometrics to the agent 121 (such as finger print picture, face picture/scan, retina scan, etc.). Agent 121 can produce a signature/hash for the provided biometric image/scan or this can be passed from the agent 121 to the service authenticator 140 for producing the signature/hash. This signature/hash is compared with a registered and expected signature/hash for the biometric. If the additional biometric comparison fails then the authentication fails and the user is not permitted to perform the request operation 131 with the service 130. The secondary authentication can be set by the user for the operation 131 and/or set by the enterprise (financial institution in the running example) based on the operation 131. In some cases, the secondary authentication is an additional required and different password that the user provides through the service application 121. In some cases, the secondary authentication is both the user-supplied password provided through the service application 121 and biometrics provided though pictures taken and supplied to the agent 122 through the application 121 utilizing an integrated camera of the device 120. In some cases, just the biometrics are used as the secondary authentication.

Assuming the primary authentication and the secondary authentication passes (if required based on the operation 131 being requested), the novel secure zone check authentication is performed.

The device 110 or the user device 120 through agents 111 or 122 obtain an audio clip to capture audio in the physical environment of the user. The audio is analyzed to determine whether other voices are detected that do not belong to the signature of a user's voice. If the audio clip determines that other individuals are present in the physical environment of the user, then the user is prompted (either within the service application 121 through text interfaces or through voice communicated responses from an audio agent of the devices 110 or 120) to approve the transaction with others being detected as being in the vicinity of the user.

Additionally, the agents 111 or 122 obtain a mapping of devices that are associated with wireless networks accessible to the devices 110 and 120. This can be done for WiFi and/or BlueTooth®. That is, most wireless-enabled devices are capable of scanning for the presence of wireless-enabled devices. The agents 111 or 122 may passively and without user's requests for any operations 131 periodically build maps of device identifiers that are in the physical environment of the devices 110 and 120, such that a determination can be made when the secure zone check authentication is being performed against known expected devices within the physical environment versus new and never seen before or unexpected devices that appear within the physical environment. This allows the agents 111 or 122 to identify when there is a foreign device within the physical environment of the user (based on the user initiating the request for processing the operation 131 through device 110 or 120). If a presence of an unknown or unexpected device appears, the user is asked to manually approve such device within the physical environment. The request of the agent 111 or 122 can be made audibly to the user through devices 110 and 120 or made through text or app based messaging on the device 120. Approval from the user may be supplied through audio commands and/or text selections through interfaces of the service application 121 (or through a SMS text response on the device 120 but outside the context of the application 121).

The secure zone authentication can include both the detection of any individuals that are not the user within the physical environment of the user and detection of foreign devices within wireless ranges of a wireless network associated with the physical environment.

In an embodiment, the secure zone authentication includes just one of the two (voice and device) authentications.

In an embodiment, whether one or both of the types (voice and device) authentications are used is based on a policy set by the user and/or the enterprise associated with the service 130 and the operation 131.

If the secure zone authentication passes (based on no detection of any audio associated with someone other than the user within the physical environment, no detection of any foreign and unexpected device within wireless range of the available wireless networks in the physical environment of the user, or based on override approval provided by the user (as discussed above)), the agent 111, 122, or the secure authenticator 140 permit the service 130 to initiate and process the operation 131 on behalf of the user.

The system 100 can be operable in a variety of different environments. For example, the system 100 can be deployed in a user's home; deployed within a bank as a front end to a headless Automated Teller Machine (ATM) activated by voice and/or user-operated device 120 interaction, deployed as an additional interface to an ATM or other type of Self-Service Terminal (SST) or Point-Of-Sale (POS) terminal, deployed within a retail environment for self-customer service, deployed within a gaming environment for self-customer service, deployed through a vehicle that the user travels in, deployed through just the user-operated device 120 such that it can be used within any physical environment that the user may be in at any given moment of time, etc.

In an embodiment, the local voice-based device 110 is a voice and network-enabled Internet-Of-Things (IoTs) device that is enhanced with the processing discussed herein with the agent 111, such as an enhanced Amazon Echo®, an enhanced Google Home®, etc.

In an embodiment, the user-operated device 120 is: a laptop, a desktop, a phone, a tablet, and/or a wearable processing device.

In an embodiment, the operation 131 is a pre-staged financial transaction that the user desires to substantially complete in advance of physically being present at an ATM where funds associated with the pre-staged financial transaction are dispensed based on presentation of the user to the ATM of a token (barcode or Quick Response (QR) code) from the user-operated device 120 to a camera/scanner of the ATM. The pre-staged financial transaction when completed or processed delivers the token back to the service application 121 on the user device 120. In an embodiment, the user requests the operation while traveling in a vehicle (here just the device 120 is used). In this latter embodiment, additional checks can be made through the service application 121 to ensure that if second authentication is required, the vehicle is parked and not moving (this can be done through location services of the user device 120 and/or through automated interaction with the vehicle's on-board diagnostic system).

In an embodiment, the service 130 is a financial institution service and the service application 121 is a mobile banking application enhanced with the agent 122 and the processing discussed above.

These and other embodiments are now discussed with reference to the FIGS. 3-5.

Figure 3:
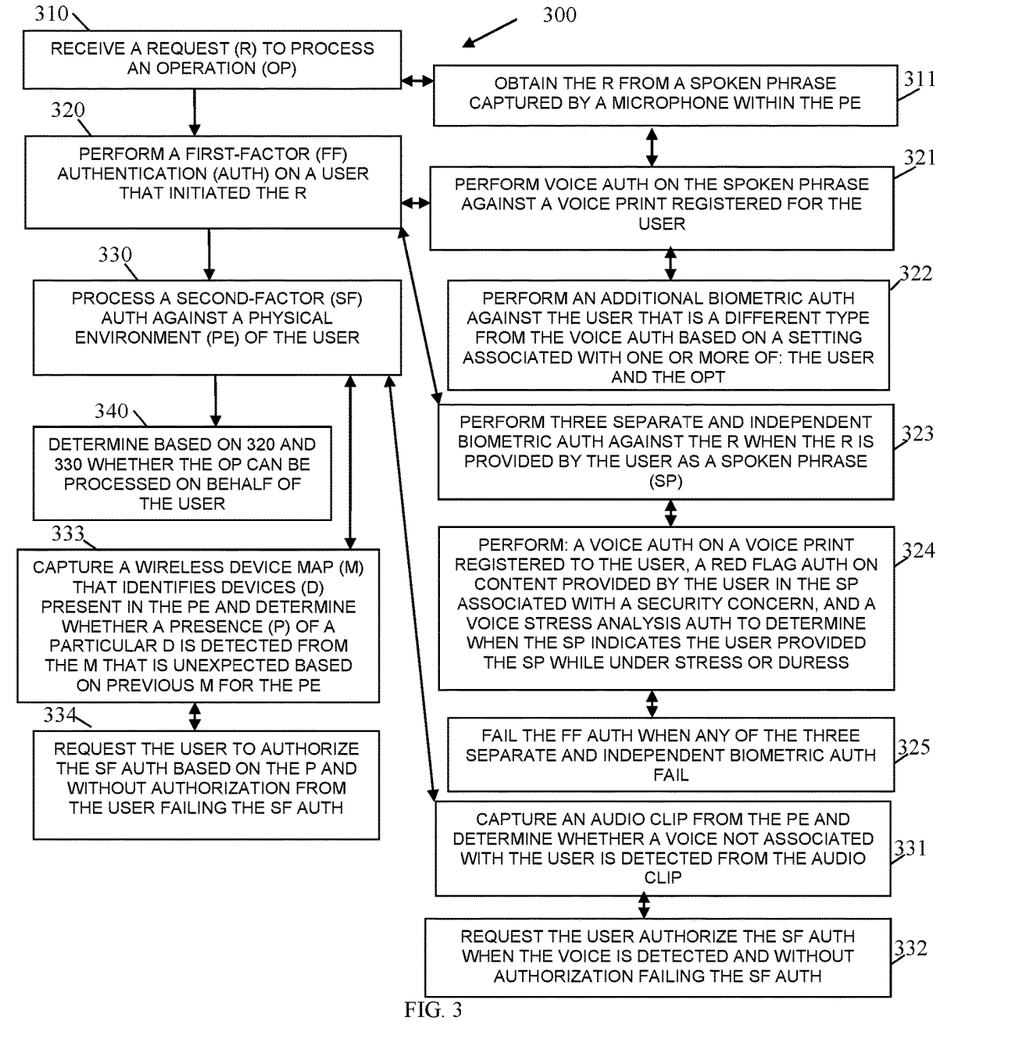
FIG. 3 is a diagram of a method for multi-factor authentication of a secure operation, according to an example embodiment.

FIG. 3 is a diagram of a method 300 for multi-factor authentication of a secure operation, according to an example embodiment. The software module(s) that implements the method 300 is referred to as an "operation authenticator." The operation authenticator is implemented as executable instructions programmed and residing within memory and/or a non-transitory computer-readable (processor-readable) storage medium and executed by one or more processors of a device. The processor(s) of the device that executes the action resolver are specifically configured and programmed to process the operation authenticator. The operation authenticator has access to one or more network connections during its processing. The network connections can be wired, wireless, or a combination of wired and wireless.

In an embodiment, the device(s) that executes the operation authenticator is one or more of: 110, 120, and/or a server device associated with the server authenticator 140.

In an embodiment, the operation authenticator is all or some combination of: the authentication agent 111, the authentication agent 122, and/or the service authenticator 140.

At 310, the operation authenticator receives a request to process an operation. The request can be received from the user through a variety of medium/communication channels, such as through SMS text, voice interaction, mobile application interface of a mobile application, and others.

In an embodiment, at 311, the operation authenticator obtains the request from a spoken phrase captured by a microphone within the physical environment (initiating environment) where the user made the request.

At 320, the operation authenticator perform a first-factor authentication on a user that initiated the request. This can be passively performed based on a device possessed by the user or can be based on a voice of the user; or can be both voice and a device in possession of the user.

In an embodiment of 311 and 320, at 321, the operation authenticator performs voice authentication on the spoken phrase against a voice print registered for the user.

In an embodiment of 321, at 322, the operation authenticator performs an additional biometric authentication against the user that is a different type from the voice authentication based on a setting associated with one or more of the user and the operation.

In an embodiment, at 323, the operation authenticator performs the first-factor authentication performs three separate and independent biometric authentications against the request when the requests is provided by the user as a spoken phrase.

In an embodiment of 323, at 324, the operation authenticator performs the three separate and independent biometric authentications as: 1) a voice authentication on a voice print registered for the user against the spoken phrase, 2) a red flag authentication on content provided by the user with the spoken phrase for detection of a security concern (such as a registered word or phrase indicating that the user is providing the request without consent), and 3) a voice stress analysis authentication to determine when the spoken phrase indicates the user provided the spoken phrase indicates the user provided the spoken phrase while under stress or duress (here no red flag content is in the spoken phrase but the pitch, tone, volume, and inflection of spoken phrase as captured indicates that potentially the user is unwilling providing the spoken phrase).

In an embodiment of 324, at 325, the operation authenticator fails the first-factor authentication when any of the three separate and independent biometric authentications fails.

At 330, the operation authenticator processes a second-factor authentication against a physical environment of the user. This was described above with the discussion of the FIG. 2 as the "secure zone check."

In an embodiment, at 331, the operation authenticator captures an audio clip from the physical environment and determine whether a voice that is not associated with the user is detected from the audio clip.

In an embodiment of 331, at 332, the operation authenticator requests the user authorize the second-factor authentication when the voice is detected and without such authorization from the user the second-facture authentication fails.

In an embodiment, at 333, the operation authenticator captures a wireless device map that identifies devices present in the physical environment (whether connected or not connected) and determines whether a presence of a particular device is detected from the map that is unexpected or unknown based on previous captures maps for the physical environment. That is, passively wireless device maps that identifies devices within the physical environment are periodically collected. From these maps and based on activity from the devices, the operation authenticator can identify known and expected devices, such that when the second-factor authentication is performed and a new map is collected any foreign device or unexpected device is detectable.

In an embodiment of 333 and at 334, the operation authenticator requests that the user specifically authorize the second-factor authentication based on the presence of the particular device within the physical environment associated with the wireless network and without such user authorization, the second-factor authentication fails.

In an embodiment, the embodiments of 331-334 are not mutually exclusive, such that all of 331-334 is processed by the operation authenticator to verify the physical environment.

Figure 4:
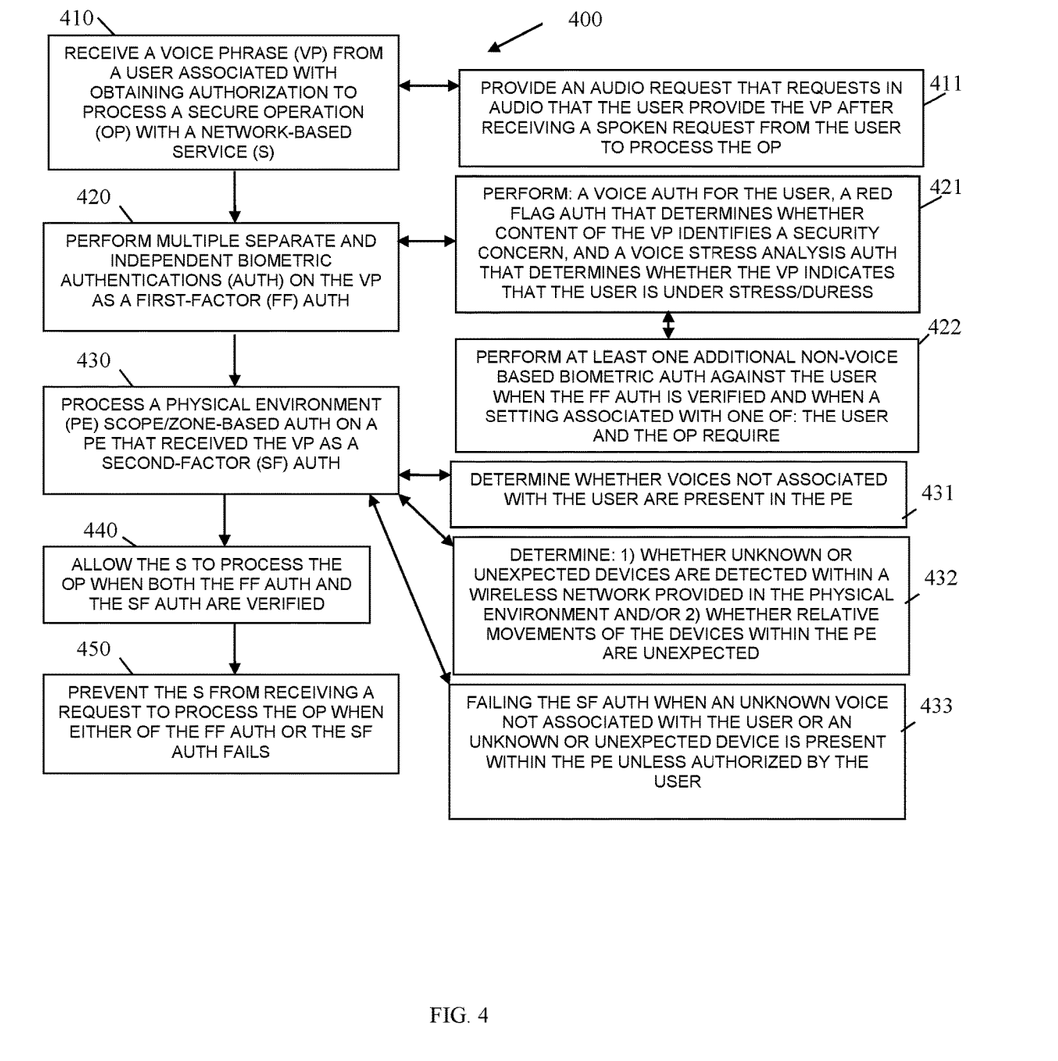
FIG. 4 is a diagram of another method for multi-factor authentication of a secure operation, according to an example embodiment.

FIG. 4 is a diagram of another method 400 for multi-factor authentication of a secure operation, according to an example embodiment. The software module(s) that implements the method 400 is referred to as a "multi-factor audio-based operation authenticator." The multi-factor audio-based operation authenticator is implemented as executable instructions programmed and residing within memory and/or a non-transitory computer-readable (processor-readable) storage medium and executed by one or more processors of a device. The processors that execute the multi-factor audio-based operation authenticator are specifically configured and programmed to process the multi-factor audio-based operation authenticator. The multi-factor audio-based operation authenticator has access to one or more network connections during its processing. The network connections can be wired, wireless, or a combination of wired and wireless.

In an embodiment, the device(s) that executes the multi-factor audio-based operation authenticator is one or more of: 110, 120, and a server device that executes the service authenticator 140.

In an embodiment, the multi-factor audio-based operation authenticator is all of or some combination of: the authentication agent 111, the authentication agent 122, the service authenticator 140, and/or the method 300.

The multi-factor audio-based operation authenticator presents another and in some ways enhanced processing perspective of the method 300 discussed above.

At 410, the multi-factor audio-based operation authenticator receives a voice phrase from a user associated with obtaining authorization to process a secure operation with a network-based service.

In an embodiment, at 411, the multi-factor audio-based operation authenticator provides an audio request that requests in audio that the user provide the voice phrase after receiving a spoken request from the user to process the secure operation. So, the user provides a voice command to process the secure operation and responsive thereto the multi-factor audio-based operation authenticator generates a spoken request that the user provide a spoken phrase for authorization. The contents of the spoken phrase may not be communicated by the multi-factor audio-based operation authenticator, such that it is a secret that the user is supposed to know for access to the service (similar to a voice-based passcode).

At 420, the multi-factor audio-based operation authenticator performs multiple separate and independent biometric authentications on the voice phrase as a first-factor authentication.

In an embodiment, at 421, the multi-factor audio-based operation authenticator performs the three separate and independent biometric authentications as: 1) a voice authentication for the user, 2) a red flag authentication that determines whether content of the voice phrase identifies a security concern, and 3) a voice stress analysis authentication that determines whether the voice phrase indicates that the user is under stress or duress when providing the voice phrase.

In an embodiment of 421 and at 422, the multi-factor audio-based operation authenticator performs at least one additional non-voice based biometric authentication (fingerprint, facial scan, retina scan, etc.) against the user when the first-factor authentication is verified and when a setting associated with one or more of the user and the secure operation indicate that the additional authentication is required. It is also to be noted that this additional biometric processing may require the user to log onto a service application 121 as a portion of the additional biometric authentication as discussed above with the discussion of the FIG. 2 under the secondary authentication processing.

At 430, the multi-factor audio-based operation authenticator processes a physical environment scope/zone-based authentication on a physical environment that received the voice phrase as a second-factor authentication.

In an embodiment, at 431, the multi-factor audio-based operation authenticator determines whether voices not associated with the user are present in the physical environment as an indication that the user is not alone and is in the presence of someone additional person(s).

In an embodiment, at 432, the multi-factor audio-based operation authenticator determines one or more of: 1) whether unknown or unexpected devices are detected within a wireless network provided in the physical environment and 2) whether relative detected movements of the devices within the physical environment are unexpected.

In an embodiment, at 433, the multi-factor audio-based operation authenticator fails the second-factor authentication when an unknown voice not associated with the user or when an unknown or unexpected device is present within the physical environment unless specifically authorized by the user.

At 440, the multi-factor audio-based operation authenticator allows the network-based service to process the secure operation when both the first-factor authentication (including any required additional authentication as discussed in the embodiment of 422) and the second-factor authentication are verified.

At 450, the multi-factor audio-based operation authenticator prevents the network-based service from receiving a request to process the secure operation when either of the first-factor authentication (including any one of any required additional authentication as discussed in the embodiment of 422) or the second-factor authentication fails.

Figure 5:
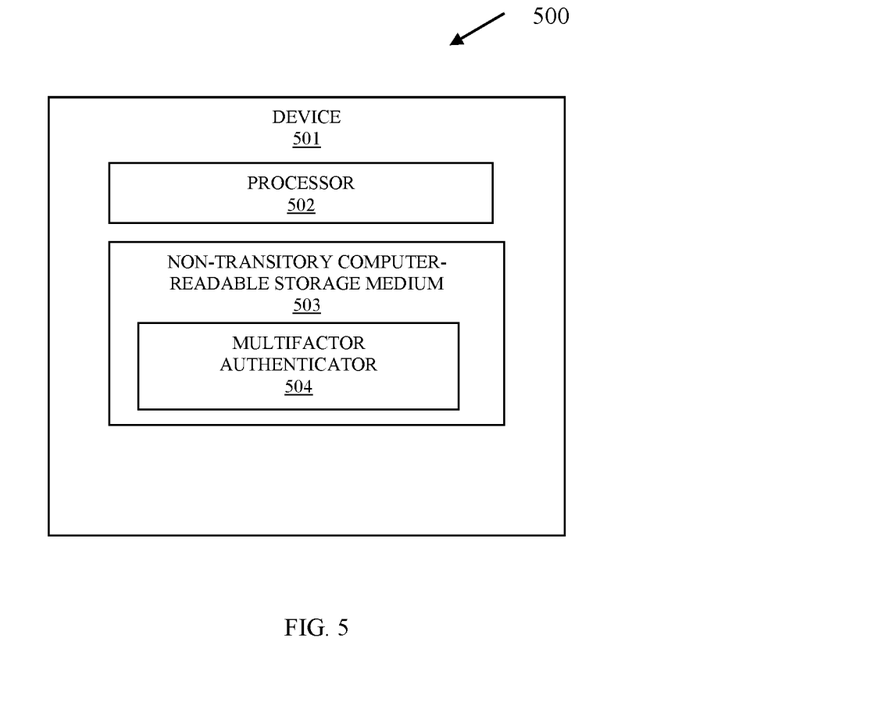
FIG. 5 is a diagram of another system for multi-factor authentication of a secure operation, according to an example embodiment.

FIG. 5 is a diagram of a system 500 for image processing to track actions of individuals, according to an example embodiment. The system 500 includes a variety of hardware components and software components. The software components of the system 500 are programmed and reside within memory and/or a non-transitory computer-readable medium and execute on one or more processors of the system 500. The system 400 communicates over one or more networks, which can be wired, wireless, or a combination of wired and wireless.

In an embodiment, the system 500 implements, inter alia, the processing described above with the FIGS. 1-4.

In an embodiment, system 500 is the system 100.

The system 500 includes a device 501 that includes at least one hardware processor 502, a non-transitory computer-readable storage medium 503, and executable instructions residing within the non-transitory computer-readable storage medium representing a multifactor authenticator 504.

In an embodiment, the device 501 is one of: the local voice-enabled device 110, the user-operated device 120, and a server device that executes the server authenticator 140.

In an embodiment, the device 501 is one of: a phone, a tablet, a laptop, a wearable processing device, a voice-enabled network device, a device integrated into a vehicle, a SST, an ATM, a POS terminal, and an IoTs device.

The multifactor authenticator 404 when executed from the non-transitory computer-readable storage medium 403 on the processor 402 of the device 401 is configured to: 1) perform a first-factor biometric authentication against a voice phrase provided by a user when the user is requesting that a secure operation be processed by a service, and wherein at least one additional separate and independent biometric authentication is processed with the first-factor biometric authentication; 2) process a second-factor authentication against a physical environment from which the voice phrase was captured for the user to determine whether other individuals are present with the user through voice or wireless connected devices present within the physical environment; and 3) passing a request to service to process the secure operation when both the first-factor biometric authentication and the second-factor authentication are verified otherwise preventing the service from receiving the request.

In an embodiment, the first factor authentication includes the voice authentication, the red flag phrase authentication, and the voice stress authentication; three separate and independent voice-based authentications.

In an embodiment, the multifactor authenticator 404 is one of: the authentication agent 111, the authentication agent 122, and the service authenticator 140, the processing presented in the FIG. 2, the method 300, and/or the method 400.

In an embodiment, the secure operation is a financial operation and the network-based service is a financial service.

In an embodiment, the secure operation is a home security operation and the network-based service is a home security service of a home-security system.

In an embodiment, a determination of what is to be considered a secure operation is made based on a setting assigned by the network-based service that identifies secure operations from less secure operations.

In an embodiment, a determination of what is to be considered a secure operation is made based on a setting assigned by a user in a profile maintained by the network-based service for an account of the user.

In an embodiment, the device 501 is an IoT device integrated into and provided as an interface option to an ATM.

In an embodiment, the device 501 is a user-operated phone, tablet, or wearable processing device.

In an embodiment, the device 501 is an enhanced version of Amazon Echo® or Google Home® that includes processing for the multifactor authenticator 404 or includes an Application Programming Interface (API) to interface with the multifactor authenticator 404.

In an embodiment, the device is an enhanced version of an on-board IoT device that is integrated into a vehicle or carried within the vehicle.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
receiving a request to process an operation, wherein receiving further includes obtaining the request from a spoken phrase captured by a microphone within a physical environment of a user;
performing a first-factor authentication on the user that initiated the request, wherein performing further includes obtaining the request from the spoken phrase captured by a microphone within the physical environment;
processing a second-factor authentication against the physical environment of the user, wherein processing further includes capturing a wireless device map that identifies devices present in the physical environment and determining whether a presence of a particular device is detected from the wireless map that is unexpected based on previous wireless device maps for the physical environment; and
determining based on the performing and the processing whether the request can be processed on behalf of the user.

2. The method of claim 1, wherein performing further includes performing at least one additional biometric authentication against the user that is a different type from the voice authentication based on a setting associated with one or more of: the user and the operation.

3. The method of claim 1, wherein performing further includes performing three separate and independent biometric authentications against the request based on the where the request is provided by the user in a spoken phrase.

4. The method of claim 3, wherein performing further includes performing the three separate and independent biometric authentications as: a voice authentication on a voice print registered to the user, a red flag authentication on content provided by the user in the spoken phrase associated with a security concern, and voice stress analysis authentication to determine when the spoken phrase indicates that the user provided the spoken phrase while under stress or duress.

5. The method of claim 4, wherein performing further includes failing the first-factor authentication when any of the three separate and independent biometric authentications fail.

6. The method of claim 1, wherein processing further includes capturing an audio clip from the physical environment and determining whether a voice not associated with the user is detected from the audio clip.

7. The method of claim 6, wherein capturing further includes requesting the user to authorize the second-factor authentication when the voice is detected and without authorization from the user failing the second-factor authentication.

8. The method of claim 1, wherein capturing further includes requesting the user to authorize the second-factor authentication based on the presence and without authorization from the user failing the second-factor authentication.

9. A method, comprising:
receiving a voice phrase from a user associated with obtaining authorization for the user to process a secure operation with a network-based service, wherein the voice phrase is a spoken phrase that is captured by a microphone within a physical environment of the user;
performing multiple separate and independent biometric authentications on the voice phrase as a first-factor authentication;
processing a physical environment scope/zone-based authentication on the physical environment that received the voice phrase as a second-factor authentication, wherein processing further includes capturing a wireless device map that identifies devices present in the physical environment and determining whether a presence of a particular device is detected from the wireless map that is unexpected based on previous wireless device maps for the physical environment;

allowing the network-based service to process the secure operation when both the first-factor authentication and the second-factor authentication are verified; and preventing the network-based service from receiving a request to process the secure operation when either of the first-factor authentication or the second-factor authentication fails.

10. The method of claim 9, wherein receiving further includes providing an audio request that requests in audio that the user provide the spoken voice phrase after receiving a spoken request from the user to process the secure operation.

11. The method of claim 9, wherein performing further includes performing the multiple separate and independent biometric authentications as three biometric authentications comprising: a voice authentication for the user, a red flag authentication that determines whether content of the spoken voice phrase identifies a security concern, and a voice stress analysis authentication that determines whether the spoken voice phrase indicates that the user is under stress or duress when providing the spoken voice phrase.

12. The method of claim 11, wherein performing further includes performing at least one additional non-voice based biometric authentication against the user when the first-factor authentication is verified and when a setting associated with one or more of the user and the secure operation require the at least one additional non-voice based biometric authentication.

13. The method of claim 9, wherein processing further includes determining whether voices not associated with the user are present in the physical environment.

14. The method of claim 9, wherein processing further includes determining one or more of: 1) whether unknown or unexpected devices are detected within a wireless network provided in the physical environment based on the wireless device map and the previous wireless device maps and 2) determining whether relative movements of the unknown or unexpected devices within the physical environment are unexpected based on the wireless device map and the previous wireless device maps.

15. The method of claim 9, wherein processing further includes failing the second-factor authentication when an unknown voice not associated with the user or an unknown or unexpected device is present within the physical environment unless authorized by the user.

16. A system, comprising:

a device that includes:

a processor;

a non-transitory computer-readable storage medium that includes executable instructions representing a multifactor authenticator; and the multifactor authenticator when executed by the processor from the non-transitory computer-readable storage medium is configured to:

perform a first-factor biometric authentication against a voice phrase provided by a user when the user is requesting that a secure operation be processed by a service, and wherein at least one additional separate and independent biometric authentication is verified with the first-factor biometric authentication, wherein the voice phrase is a spoken phrase that is captured by a microphone within a physical environment of the user;

process a second-factor authentication against the physical environment from which the voice phrase was captured for the user to determine whether other individuals are present with the user through voice or wireless connected devices present within the physical environment, wherein processing further includes capturing a wireless device map that identifies devices present in the physical environment and determining whether a presence of a particular device is detected from the wireless map that is unexpected based on previous wireless device maps for the physical environment; and passing a request to service to process the secure operation when both the first-factor biometric authentication and the second-factor authentication are verified otherwise preventing the service from receiving the request.

17. The system of claim 16, wherein the device is one of: a phone, a tablet, a laptop, a wearable processing device, a standalone audio-enabled network device, a device integrated into a vehicle, a Self-Service Terminal, an Automated Teller Machine, a Point-Of-Sale terminal, and an Internet-of-Things (IoTs) enabled device.

* * * * *